United States Patent [19]

Thomson et al.

[11] 4,024,930
[45] May 24, 1977

[54] LUBRICATING DEVICE AND METHOD

[75] Inventors: Ronald E. Thomson, Cambridge; Philip J. Kast, Madison, both of Wis.

[73] Assignee: Madison-Kipp Corporation, Madison, Wis.

[22] Filed: Oct. 3, 1975

[21] Appl. No.: 619,421

[52] U.S. Cl. .............................. 184/15 B; 83/169; 184/35; 184/27 A

[51] Int. Cl.[2] ......................................... F16N 7/14

[58] Field of Search ............ 184/15 R, 6.7, 35, 37, 184/7 R, 7 F, 15 A, 15 B; 30/123.4; 83/169; 74/230

[56] References Cited

UNITED STATES PATENTS 3,771,623  11/1973  Sugawara et al. ............... 184/15 A

*Primary Examiner*—Richard C. Pinkham
*Assistant Examiner*—William R. Browne
*Attorney, Agent, or Firm*—Merriam, Marshall, Shapiro & Klose

[57] ABSTRACT

A chain lubricating device in which lubricating fluid passes through an inlet line into a shaft to a piston chamber in a pump body where the lubricating fluid is then evacuated to discharge device located on a sprocket to which the pump body is attached, both the pump body and sprocket being adapted to rotate about the fixed shaft. The pump body has a piston and cylinder for receiving and for evacuating lubricating fluid. When the lubricating fluid is evacuated it passes through a passage from the pump body to the sprocket positioned on the shaft. As the sprocket and the pump body rotate about the shaft, the lubricating inlet manifold in the shaft will intermittently align itself with the inlet to the pump body to receive a lubricating fluid, while at the same time the lubricating outlet manifold of the shaft intermittently aligns itself with a passage leading to the sprocket. The lubricating fluid then enters the sprocket and is then discharged from an outlet onto the conveyor system.

20 Claims, 7 Drawing Figures

FIG.6

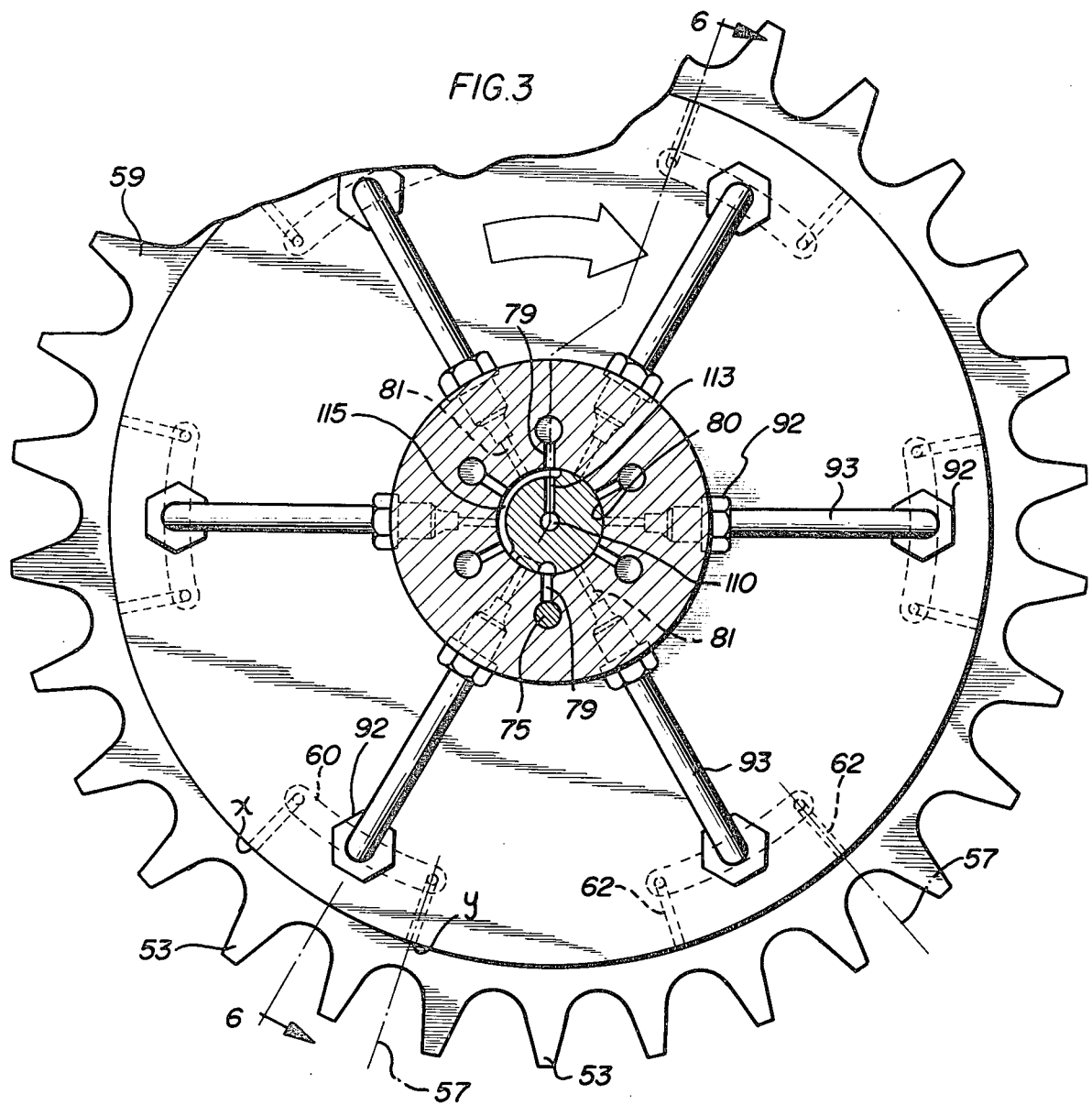
FIG.3
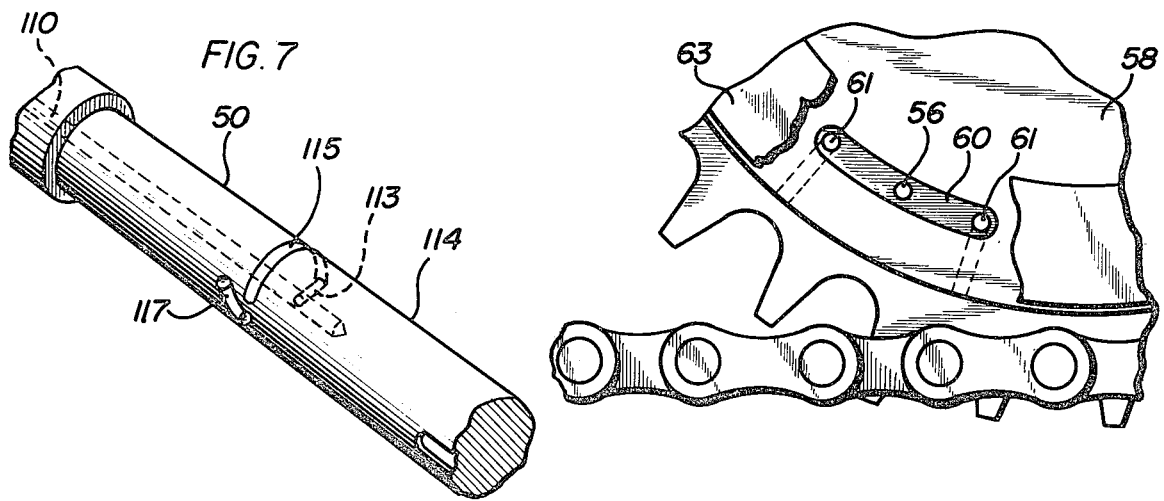
FIG.7
FIG.4

LUBRICATING DEVICE AND METHOD

BACKGROUND OF THE INVENTION

This invention relates to a lubricating device and method for lubricating high speed and/or low pitch chain type conveyors and more particularly to a lubricating device in which a rotatable sprocket means having a pump body connected thereto is adapted to rotate about a shaft means, to provide shots of lubricating fluid to a conveyor chain or other system while the chain or system is in operation.

When lubricating a chain having high speeds (e.g., 120 ft./minute) and/or small pitch (e.g., 2 inches or less in pitch) it has been found that problems arise with lubricating system presently available. In some instances the lubricating pumps are inadequate because too many shots of lubricating fluid are required over a relatively short period of time. Other lubricating pumps presently available cannot be recycled fast enough to provide the required shots of lubricant so that portions of a chain or system to be lubricated fail to receive the necessary lubrication.

It also has been found that conventional trip devices such as limit switches are not satisfactory with conveyor systems involving high speeds. Unfortunately, these switches do not provide the efficient operation that is necessary for this particular type conveyor lubrication application. While other means are available for activating a lubricating device, e.g., photoelectric cell, they are either too costly, too complicated in structure or necessitate an excessive amount of maintenance.

Another problem relates to the play or movement in the chain conveyor when it is in operation during the course of which the chain can move laterally or vertically within certain tolerances. With larger chains this movement presents no significant problem, however, with small pitch chains, this play or variation in chain location causes problems in lubricating the desired area on the chain.

Another area of concern in applications involving high speed conveyor systems is that the lubricating fluid dispensing means should move at substantially the speed of the conveyor chain so that when a lubricating fluid is ejected from a fluid discharge nozzle it will deliver what is known as a clean shot to that portion of the conveyor system to be lubricated. Failure to deliver clean shots of lubricant to the system provides serious disadvantages. If the lubricant is not deposited properly on the conveyor, the shot of fluid will often shatter, whereby the fluid dispenses in an undesired random manner on the conveyor, thereby causing inefficient lubrication in addition to causing problems of drippage which necessitate accessory devices to catch the excess lubricant. The shattering of a shot of lubricating fluid has been found to occur when there is a significant difference in velocity between the chain speed and the speed of the lubricating fluid discharge means.

It is desired to have a lubricating device that can deliver clean shots of lubricating fluid at desired locations on a high speed and/or low pitch chain conveyor or system in which the fluid discharge port on the lubricating device travels at substantially the same velocity as the chain to be lubricated. Further, it is desired that the speed of the chain and the discharge means of the lubricating device be synchronized so that both travel at substantially the same speed irrespective of whether the conveyor speed is purposely changed or a change in conveyor speed arises due to an increase or decrease in load on the conveyor chain.

It is also desired to have a lubricating device which will allow lubricating fluid to be delivered to the appropriate spot on a chain while taking into account the play in the chain or conveyor system.

SUMMARY OF THE INVENTION

With the view of overcoming the various problems associated with lubricating devices employed in lubricating high speed and/or low pitch chains, the invention disclosed and claimed herein relates to a lubricating system which provides a clean shot of lubricating fluid to the desired location on the conveyor system with the fluid discharge means being synchronized to travel at substantially the same speed as the conveyor chain when fluid is ejected from the discharge means.

Briefly, the invention relates to a device comprising a shaft which is fixed relative to a chain conveyor to be lubricated. The shaft has a fluid inlet and outlet manifold located on it. A sprocket is attached for rotation about the shaft with the rotation of the sprocket being achieved by positioning sprocket teeth in the spaces between links of the conveyor chain. A pump body is attached to the sprocket and is adapted to rotate with the sprocket.

The pump body includes a plurality of cam activated, spring biased piston means which are activated in a manner designed to permit lubricating fluid to exit from a piston chamber to an exit manifold on the shaft, after which the fluid is delivered to fluid discharge means located on the rotating sprocket where lubricating fluid is ejected in a clean shot to one or more locations on the chain to be lubricated.

The lubricating device of the present invention further includes means for adjusting the volume of lubricant to be deposited and further includes means for advancing or retarding the timing of the shot of lubricating fluid so that it strikes the conveyor chain or systems at the desired point or points. This is particularly important when one piston is used to deliver fluid to a plurality of discharge nozzles.

In operation, the sprocket teeth engage the chain of a conveyor system to be lubricated, whereby the sprocket rotates about the fixed shaft.

Lubricating fluid passes through an axial inlet in the shaft, from where it transfers to an inlet manifold aligned with a first passageway in the rotating pump body. Oil in the inlet manifold passes through the first passageway into a piston chamber. Upon further rotation of the pump body, the first passageway is aligned with the shaft exit manifold.

As the pump body rotates about the shaft to align the inlet and outlet manifolds with the first passageway, a cam means forces a spring biased piston to move, causing fluid in the chamber to evacuate through the first passageway into the outlet manifold on the shaft. The fluid then enters a second pump body passageway after which the fluid is transferred to the fluid dispensing nozzles on the rotating sprocket whereupon a proper amount of fluid is ejected onto those portions of the conveyor chain or system to be lubricated.

The lubricating system of the present invention provides a clean shot of fluid onto a desired location of a high speed and/or low pitch chain conveyor or system while the fluid dispensing means travels at the same speed as the chain at the time of lubrication.

BRIEF DESCRIPTION OF THE DRAWINGS

The invention will be better understood from the following detailed description thereof, taken in conjunction with the accompanying drawings wherein:

FIG. 3 shows a fragmentary section view of the pump body and sprocket taken along lines 3—3 in FIG. 6;

FIG. 4 shows a fragmentary section view of the sprocket manifold;

FIG. 5 shows a fragmentary bottom partial section view of a roller chain conveyor with sprocket teeth positioned in said conveyor;

FIG. 7 shows a fragmentary perspective view of the shaft about which the sprocket and pump body are adapted to rotate.

DETAILED DESCRIPTION OF THE DRAWINGS

Figure 1:
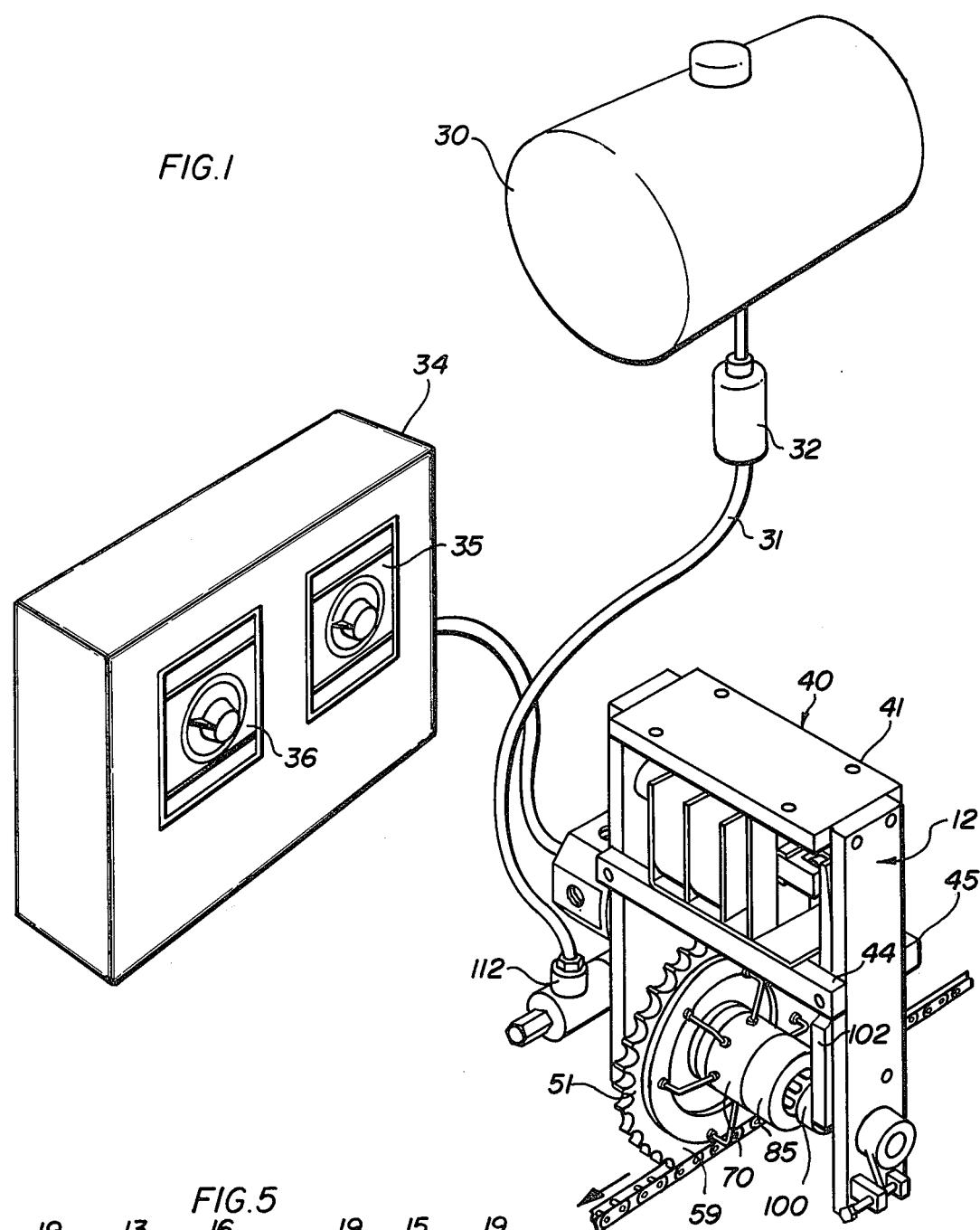
FIG. 1 shows a perspective view of the lubricating system of the invention disclosed and claimed herein.

Referring to the drawings, FIG. 1 shows chain conveyor 10, which is adapted to be lubricated by the lubricating device 12. While chain conveyor 10 can be of different types, a roller chain conveyor is one application of a conveyor system that often requires lubrication. In FIG. 5 a portion of roller chain conveyor 10 is shown and includes chain pin links 13, 14 joined together by chain bushing link 15. Each pin link comprises side plates 16, 17 whose respective ends are connected together by pins 19. A bushing 20 surrounds pin 19 and a roller 21, adapted to contact a sprocket tooth normally employed to move the chain, is disposed over bushing 20. With this type chain a clean shot of lubricant is required at the location of the joint connecting the chain links and specifically the area between the pin 19 and roller 21, as well as the area between pin 19 and side plates 16, 17.

The lubricating system of the present invention includes a lubricating fluid supply reservoir 30 from which fluid passes through oil inlet line 31, fluid filter 32 to fluid shut-off valve 112. The fluid passes through valve 112, which can be solenoid actuated, into the pump device to be described. The fluid is then ejected in a clean shot onto those portions of conveyor 10 to be lubricated.

Timer device 34 is connected to pump unit 12 to provide for intermittent pump operation. The timer device can be any conventional type unit. For purposes of illustration, timer 35 allows lubricating device 12 to operate every few hours or days, whereas timer 36 serves to limit the time frame necessary for a particular conveyor system lubricating application once the device has been placed in a lubricating condition.

Figure 2:
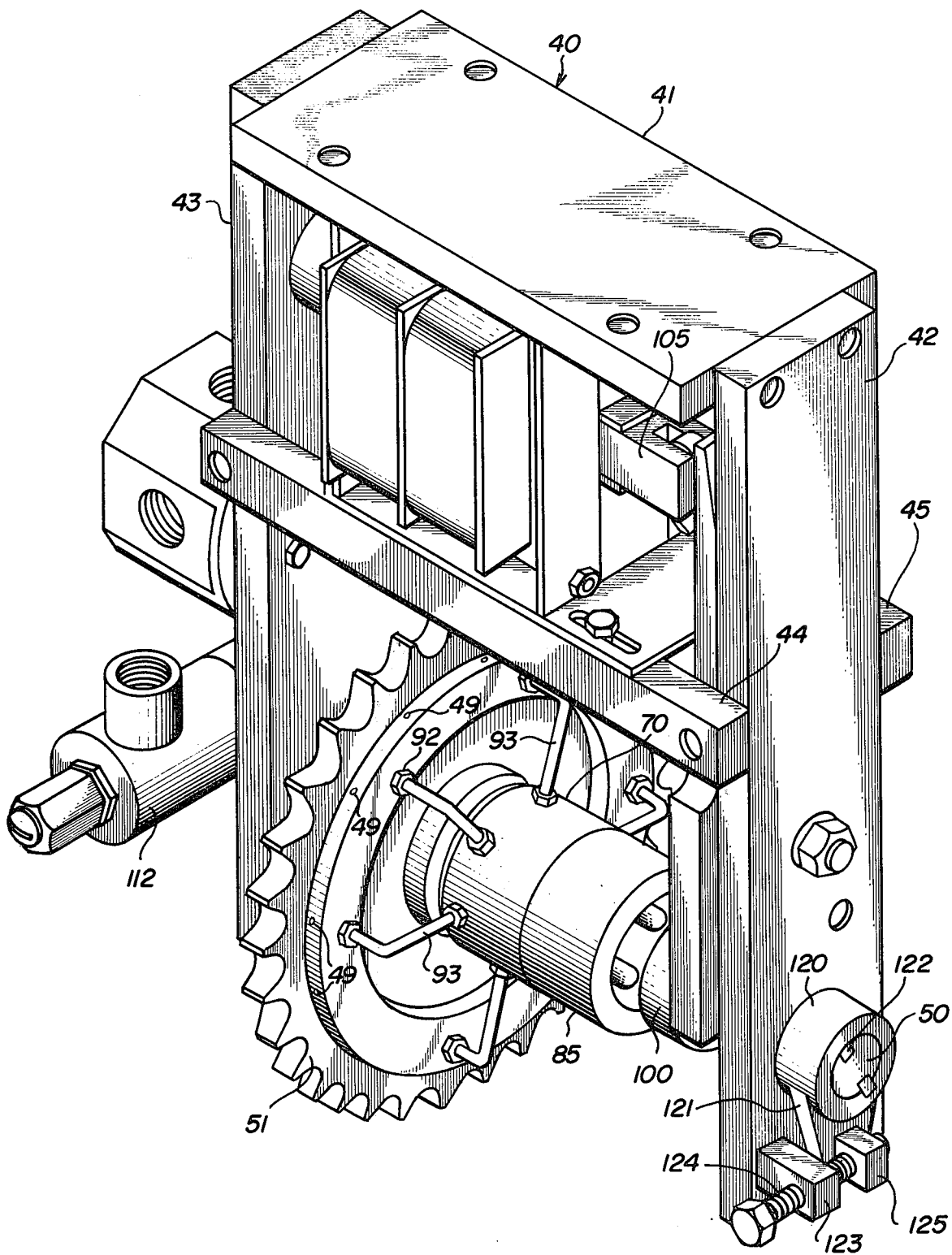
FIG. 2 shows a fragmentary perspective view of the lubricating device of the present invention and more particularly the sprocket and pump body which are adapted to rotate about a shaft located in a fixed position from the chain to be lubricated.

Pump device 12, as shown in FIG. 2, includes a frame 40, which is adapted to be connected in any suitable manner, e.g., welding, to a conveyor frame or the like. As seen in FIG. 1, device 12 is positioned above chain conveyor 10 so that lubricating fluid ejected from the discharge nozzles will be parallel to the chain. However, the device could be oriented so that the pump device is positioned adjacent to the chain to be lubricated.

Frame 40 includes base 41 suitably connected to frame side plates 42, 43. Bars 44, 45 are connected by suitable fastening means at each of their respective ends to a side plate.

Figure 6:
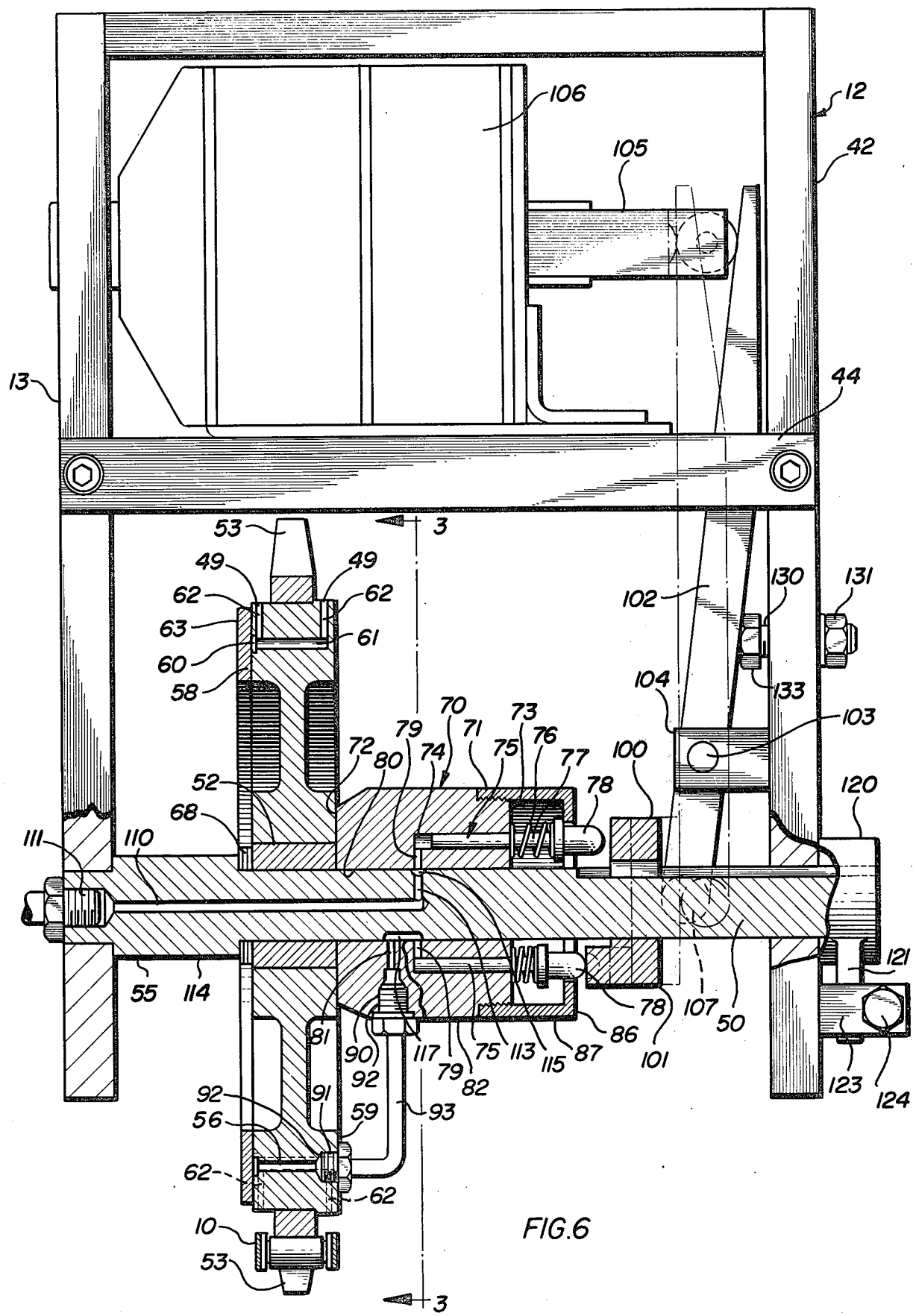
FIG. 6 shows a fragmentary front partial section view taken along the lines 6—6 in FIG. 3 and illustrates further the lubricating device of the present invention.

Shaft 50, FIG. 6, is seated in side plates 42, 43. The shaft is normally fixed in the side plates so that it will not rotate; however, the shaft includes means for adjusting the position of the shaft.

Sprocket 51 has sprocket teeth 53 which are adapted to engage chain conveyor 10 in the space between the chain links 13, 14, 15 as seen in FIG. 5. Upon movement of chain 10 in the direction shown in FIG. 1, sprocket 51 rotates clockwise about shaft 50 (when viewed from cam 100 side).

Sprocket 51 has a bearing 52 pressed into it. Bearing 52 is seated on shaft 50 and maintained in position from side plate 43 by means of spacer section 55 which is an integral part of shaft 50. A second bearing 68 is positioned between spacer section 55 and bearing 52 to properly position sprocket 51 on shaft 50.

A plurality of bores 56, positioned contiguous to the sprocket teeth, extend through the entire width of the sprocket.

In the particular lubricating device illustrated herein, six bores 56, spaced 60° apart, are located in sprocket 51.

Sprocket face 58, FIGS. 4 and 6, is recessed or grooved at 60 to provide lubricating fluid manifolds when manifold cover ring 63 is attached. Bores 61, which extend along a major portion of the width of sprocket 51, are located into the groove 60 along tooth pocket centerlines 57. As shown in FIG. 6, additional bores 62 for receiving fluid discharge nozzles 49 extend radially along sprocket tooth pocket center lines and connect with bore 61. Bores 62 are located contiguous to sprocket faces 58, 59, FIG. 6, and communicate with bore 61 to form discharge passages. Nozzle inserts 49 can be inserted in bores 62. The nozzles can be of different designs but one application includes a nozzle insert 49 which is a plug pressed into bore 62 with the plug having a bore size sufficient to allow fluid to be ejected from it in a shot rather than a mist, spray or stream.

Normally it is necessary to lubricate each joint of a chain, which would require that there be discharge passages at every sprocket tooth pocket center line. It is possible to have a plurality of bores 61 located in each groove 60, one on each sprocket tooth centerline. In those cases where it is necessary to have only one bore 61 for each bore 56 then bore 61 and groove 60 can be eliminated and bores 62 can be made to communicate directly with bore 56.

Pump body member 70 is seated on shaft 50 and is connected to sprocket 51 and is adapted to rotate with sprocket 51 about shaft 50. Pump member 70 includes a cylindrically shaped body 71, having one of its two ends 72, 73 attached to sprocket 51 by any suitable manner. Pump body 71 includes a plurality of piston chambers 74, each of which is located along a radial axis on pump body 71. Piston 75 is disposed in chamber 74. Piston 75 is normally baised outwardly by means of a spring 76 located on the piston shaft 77 between pump body end 73 and piston head 78.

A first lubricating fluid passage 79 extends from each piston chamber 74 to pump body wall 80.

Pump body 71 also has a second fluid passage 81 which extends radially outward from the inner wall which forms bore 80 to the outer cylindrical wall 82.

A piston retaining cap 85 having a head section 86 integral with a threaded side wall 87 is threaded to pump body 71. As seen in FIG. 6, head section 86 is adapted to contact piston head 78 to limit the travel of a piston 75 when it is urged outwardly from chamber 74.

Pump body 71 and sprocket 51 each have openings 90, 91 which receive a fitting 92 on fluid conduit 93. Fluid conduit 93 provides a means for transferring lubricating fluid from pump member 70 to sprocket 51. It will be observed, e.g., FIG. 3, that fluid conduit 93 is provided for each piston chamber 74.

A cam member 100 having a cam lobe 101 is keyed to shaft 50 so that the cam can be moved axially along the length of the shaft, however, it is precluded from rotation about shaft 50. Cam lobe 101 is adapted to contact piston heads 78 when the pump is in operation.

A cam engaging lever 102 is pivotally connected at 103 to bracket 104. One end of lever 102 is adapted to contact cam 100 while the remaining end of the cam lever is adapted to be contacted by a solenoid rod 105, which in turn is actuated by solenoid 106 which is seated on a plate resting on bars 44, 45. When solenoid 106 is activated, rod 105 moves outward and lever 102 is pivoted at 103, FIG. 6, so that lever end 107 contacts cam member 100 and forces it into an operative position along shaft 50.

shaft 50, which normally in a fixed position, includes a fluid inlet passage 110 which connects with a fitting 111 from an oil shut-off solenoid valve 112, which is shown in FIG. 1. Passage 110 communicates with shaft passage 113, which extends from bore 110 to shaft wall 114. Shaft wall 114 is grooved or recessed along the radial axis to form a fluid inlet manifold 115. A second fluid exit manifold 117 is also formed by a recess or groove 117 and extends somewhat axially along shaft 50 as seen in FIG. 7.

OPERATION

In operation, timers 35, 36 are set so that a conveyor system will be lubricated periodically. When lubrication is required, timer 35 will be activated, which in turn will cause an appropriate electrical circuit to be energized and solenoid valve 112 will open to allow lubricating fluid to pass from the reservoir 30 into inlet line or passage 110 of shaft 50.

Simultaneously, solenoid 106 is activated and valve rod 105 will move outward as shown in FIG. 6 to pivot lever 102 so that lever 102 causes cam member 100 to move axially along shaft 50 to an operative position whereby piston heads 78 on pistons 75 will be engaged by cam lobe 101 whereby pistons 75 will be urged inwardly along the length of piston chamber 74.

Lubricating fluid passes from inlet line 100 through passage 113 into fluid inlet manifold 115.

Shaft 50 is synchronized relative to piston body 71 so that fluid in inlet manifold 115 will enter passage 79 and piston chamber 74 at which time piston 75 is in an open position being urged outwardly by spring 76. After the chamber has been filled with the desired amount of fluid, pump body 71 continues to rotate relative to shaft 50. In this period of rotation, passage 79 in pump body member 71 does not contact fluid inlet manifold 115 or outlet manifold 117 so that fluid remains in chamber 74. As sprocket 51 and pump 70 continue to rotate, piston head 78 comes in contact with cam lobe 101 which cams piston head 78 and piston 75 inwardly against the action of spring 76. As piston 75 is urged inwardly, the pump body rotates to a position where passage 79 communicates with outlet manifold 117. Fluid in piston chamber 74 is forced out of chamber 74 as piston 75 is cammed inward and the fluid passes from the chamber through passage 79 into exit manifold 117.

As pump body 71 continues to rotate, outlet passage 81 becomes aligned with shaft exit manifold 117 whereby lubricating fluid passes from exit manifold 117 through passage 81 and conduit 93.

From conduit 93 the fluid enters bore 56 where, as seen in FIG. 4, it passes through to manifold 60. The fluid then travels from manifold 60 through bores 61 and 62 where the fluid is then ejected in a shot through discharge nozzle means 49 onto chain 10.

It will be observed in the illustration shown in FIG. 3 that the fluid will be ejected from the discharge nozzles 49 on sprocket 51 at the location of $x$ and $y$ (which are fixed in space). If it is desired to either advance or retard the point where lubricating fluid is ejected from the discharge nozzles, shaft 50 can be adjusted to allow fluid ejection at points other than $x$ and $y$. This adjustment is seen more clearly by reference to FIGS. 2 and 6.

Shaft 50 extends beyond side plate 42. A lever 120 having lever arm 121 is keyed at 122 to the end of shaft 50. A threaded boss 123 extends outward from side wall 42 and bolt 124 is threaded through boss 123 and is passed through boss 125 extending outward from lever arm 121. Bolt 124 is then fixed by pins or other suitable means to boss 125 whereupon turning of the bolt in boss 123 will cause lever 10 to rotate shaft 50 to a different position. Movement of shaft 50 relocates manifolds 115 and 117 relative to conveyor chain 10 so that upon further actuation of the lubricating device, lubricating fluid will be ejected at points other than $x$ and $y$. This adjustment means serves to provide accurate ejection of the shot so that the fluid will hit those portions of the chain to be lubricated.

In the event it is desired to limit the volume of the lubricating fluid which is ejected, an adjustment is provided by relocating the cam along the axis of shaft 50. Referring to FIG. 6, a bolt 130 is threaded into sideplate 42 and locked by nut 131. Turning bolt 130 causes the bolt head 133 to move closer to or away from sideplate 42. If it is desired to have piston chamber 74 of a volume to permit the maximum amount of fluid to be received, bolt 130 is turned to the position illustrated in FIG. 6. In the event it is desired to limit the volume of lubricating fluid to be ejected, the bolt is turned so that lever 102, when engaged by rod 105, will maintain the cam farther from piston head 78 thereby limiting the travel of piston 75 when biased by the cam lobe 101 which in turn serves to reduce the volume of piston chamber 74 (i.e. displacement is reduced).

The lubricating device of the present invention serves to obviate problems associated with high speed and/or low pitch conveyor chains or systems. It is appreciated, however, that this lubricating device could be utilized, if desired, with conveyor systems travelling at other speeds.

Similarly, while solenoid means have been illustrated for controlling the actuation of the device, it is appreciated that other valve means which are obvious to a person skilled in the art could be utilized. For example, the sprocket could be raised or lowered relative to the conveyor as opposed to utilizing the cam engagement lever disclosed herein.

While six piston chambers have been illustrated, it is well understood that many other arrangements could be utilized and that the manifold arrangements disclosed and shown on shaft 50 and sprocket 51 could be varied. Further, it is appreciated that the cam design can vary depending upon the application in which the lubricating device of the present invention is to be utilized.

The device 12 has been illustrated as setting on top of chain 10. Device 12 is preferably positioned to cause a sufficient tension to be placed on that portion of the chain being lubricated so that movement of the chain at that area is restricted. The chain tension can be effected by urging the chain downward with sprocket 51 while other sprockets spaced from sprocket 51 serve to urge the chain upward. When the chain is restricted in its movement at the area of lubrication, the problems of improper lubrication heretofore discussed are minimized.

The foregoing description and drawings merely explain and illustrate the invention and the invention is not limited thereto, except insofar as the appended claims are so limited, as those who are skilled in the art who have the disclosure before them will be able to make modifications and variations therein without departing from the scope of the invention.

What is claimed is:

1. A lubricating system for lubricating conveyor chains, said system comprising:
   a shaft fixed relative to a chain to be lubricated;
   said shaft having lubricating fluid inlet means and an inlet and outlet manifold means;
   a sprocket adapted to rotate on said shaft and having at least a sprocket tooth for engagement with a conveyor chain to be lubricated and a lubricating fluid discharge means positioned on the sprocket;
   said sprocket including lubricating fluid discharge means for ejecting lubricating fluid from said discharge means onto a chain to be lubricated;
   a pump body attached to said sprocket and adapted for rotation about said shaft;
   said pump body having a chamber for receiving lubricating fluid;
   means associated with said pump body for evacuating lubricating fluid from said chamber;
   means for providing a lubricating fluid passage between said lubricating fluid inlet and outlet manifold means and said pump body chamber; and,
   means for delivering lubricating fluid from said pump body to said fluid discharge means said sprocket, whereby when lubricating fluid in said chamber is evacuated, it passes from said chamber, through said shaft lubricating fluid outlet manifold and lubricating fluid delivery means to said discharge means associated with said sprocket where the lubricating fluid is ejected onto a chain to be lubricated.

2. A lubricating system in accordance with claim 1 wherein said shaft includes an axial bore extending along a portion of said shaft and a passage from said shaft to said lubricating fluid inlet manifold.

3. A lubricating system in accordance with claim 2 wherein said inlet and outlet manifold means are spaced from each other on said shaft.

4. A lubricating system in accordance with claim 1 wherein said pump body includes at least one piston adapted for movement within said chamber, said piston being biased to maintain said chamber in an open condition; and
   a cam means for camming said at least one piston to a closed position in which the volume of said chamber is reduced.

5. A lubricating system in accordance with claim 1 wherein said sprocket includes a first fluid passageway through the width of said sprocket;
   a manifold communicating with said passageway; and
   a second passageway providing a passage from said manifold to said discharge means.

6. A lubricating system in accordance with claim 1 and including means for adjusting the volume of lubricating fluid to enter said chamber.

7. A lubricating system in accordance with claim 1 and including means for advancing or retarding the location where the lubricating fluid is ejected from said discharge means to a chain to be lubricated.

8. A lubricating system in accordance with claim 7 wherein said adjusting means includes means for rotating said shaft whereby said shaft inlet and outlet manifold means are repositioned.

9. A lubricating device for lubricating conveyor systems, said device comprising:
   a shaft in a fixed position during a lubricating operation; said shaft having a lubricating fluid inlet line, a lubricating and inlet manifold and a lubricating and outlet manifold;
   a sprocket having sprocket teeth and sprocket center lines, said sprocket being seated on said shaft and adapted to rotate about said shaft, said sprocket teeth being adapted to engage a conveyor system to be lubricated;
   said sprocket having lubricating fluid discharge means located on said sprocket tooth sprocket center lines;
   a pump member seated on said shaft and attached to said sprocket for rotation with said sprocket about said shaft;
   said pump member comprising a pump body having a plurality of piston chambers and a first passage associated with said chamber and said shaft inlet manifold;
   said pump body chamber each having a second passage associated with said shaft outlet manifold;
   delivery means associated with said second passage and said discharge means on said sprocket;
   a biased piston located in each of said chambers; and
   means for actuating said pistons to reduce the volume of said chambers and evacuate lubricating fluid from said chambers whereby lubricating fluid can enter said inlet line, pass through said inlet manifold and first passage from where the lubricating fluid is adapted to enter said chamber followed by evacuation of said fluid into said second passage and outlet manifold from where said fluid passes into said delivery means where it travels to said discharge means where lubricating fluid is ejected from said lubricating device onto a conveyor system to be lubricated.

10. A lubricating device in accordance with claim 9 wherein said delivery means includes conduit means connecting said pump body to said sprocket.

11. A lubricating device in accordance with claim 9 wherein said means for actuating said pistons includes a cam means for urging said pistons inwardly into said chambers whereby the volume of the chamber will be reduced.

12. A lubricating device in accordance with claim 9 and further including means for adjusting the travel of said pistons whereby the volume of said chambers can be adjusted.

13. A lubricating device in accordance with claim 9 and further including means for advancing or retarding the lubricating fluid ejection onto a conveyor system wherein said means includes adjusting means for rotating said shaft relative to a chain or system to be lubricated.

14. A lubricating device for lubricating a conveyor system, said device comprising:
   a shaft secured in a fixed position during a lubricating operation, said shaft including a lubricating inlet manifold and a lubricating outlet manifold;
   a sprocket connected to said shaft and having sprocket teeth for engaging a conveyor system to be lubricated;
   said sprocket having a lubricating fluid discharge means for receiving the lubricating fluid from the outlet manifold;
   a pump member comprising a pump body having at least one piston chamber and fluid passageways communicating with said chamber and said shaft inlet and outlet manifolds;
   lubricating fluid delivery means connected to said passageways and said lubricating fluid discharge means on said sprocket; and,
   means disposed in said chambers for reducing the volume of said at least one piston chamber and evacuating lubricating fluid from said at least one piston chamber whereby lubricating fluid can pass through said inlet manifold and passageway to said chamber where the lubricating fluid is subsequently evacuated to said outlet manifold and passes through said delivery means to said discharge means where the lubricating fluid is ejected onto a conveyor system to be lubricated.

15. A lubricating device in accordance with claim 14 wherein said shaft includes a lubricating fluid inlet line.

16. A lubricating device in accordance with claim 14 wherein said pump body includes a plurality of chambers and a first and second passageway associated with each of said chambers whereby lubricating fluid is adapted to pass from said inlet manifold to said first passageway, through said chamber and second passageway to said outlet manifold.

17. A lubricating device in accordance with claim 14 wherein said delivery means includes a lubricating fluid conduit means.

18. A lubricating device in accordance with claim 14 and further including adjusting means for adjusting the volume of said chamber.

19. A lubricating device in accordance with claim 14 and further including means for adjusting the piston of said shaft relative to said sprocket and pump member whereby the advancing or retarding of the lubricating fluid ejection onto a conveyor system to be lubricated can be adjusted.

20. The method of lubricating a conveyor system according to the steps of:
   receiving lubricating fluid from a storage area;
   passing said lubricating fluid through to an inlet manifold of a rotatary pump body positioned on a shaft, and said rotatary pump body having at least one chamber therein;
   rotating said pump body to a first position with respect to said shaft where lubricating fluid is conveyed from said inlet manifold to said piston chamber;
   rotating said pump body to a second position with respect to said shaft so that said piston chamber connects with an outlet manifold;
   subsequently evacuating said lubricating fluid from said piston chamber and passing said lubricating fluid to a delivery means connecting said pump body to a sprocket having teeth adapted to contact a conveyor system to be lubricated;
   passing lubricating fluid from said delivery means to a discharge means located in said sprocket; and
   thereafter ejecting lubricating fluid from said discharging means onto a conveyor system to be lubricated.

* * * * *

UNITED STATES PATENT AND TRADEMARK OFFICE
CERTIFICATE OF CORRECTION

PATENT NO. : 4,024,930
DATED : May 24, 1977
INVENTOR(S) : Ronald E. Thomson & Philip J. Kast It is certified that error appears in the above-identified patent and that said Letters Patent are hereby corrected as shown below:

Column 1, line 16, change "system" to --systems--; column 5, line 31, change "shaft" to --Shaft--; column 5, line 31, following "which" insert --is--; column 5, line 57, following "line" change "100" to --110--; column 6, line 35, following "lever" change "10" to --120--; column 7, line 54, following "means" insert --connected to--; column 8, line 47, change "chamber" to --chambers--; column 8, line 61, following "where" insert --the--; column 9, line 12, following "a" delete "chain or".

Signed and Sealed this

Fourth Day of October 1977

[SEAL]

Attest:

RUTH C. MASON
Attesting Officer

LUTRELLE F. PARKER
Acting Commissioner of Patents and Trademark